INVENTORS
VINCENT S. PENOTE AND
HANS L. PREU
BY Teare, Fetzer & Teare
ATTORNEYS

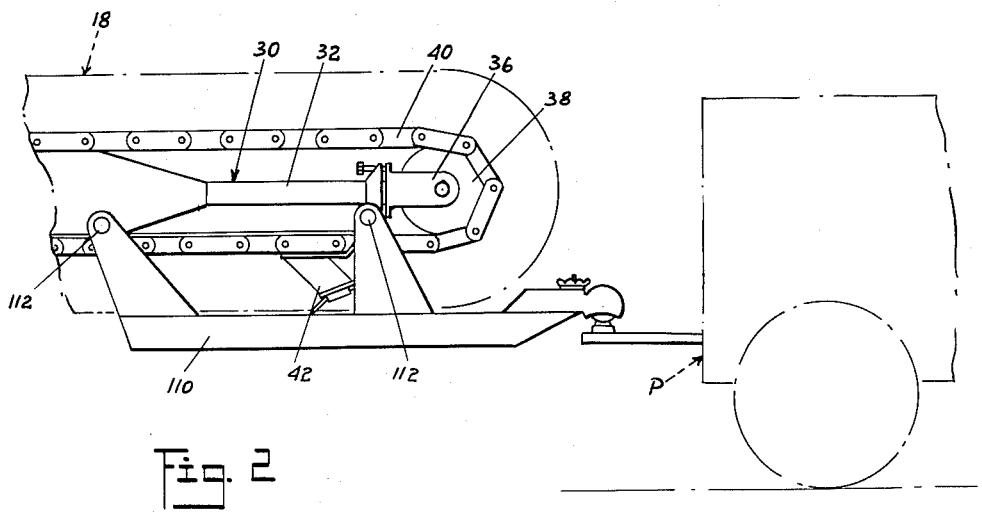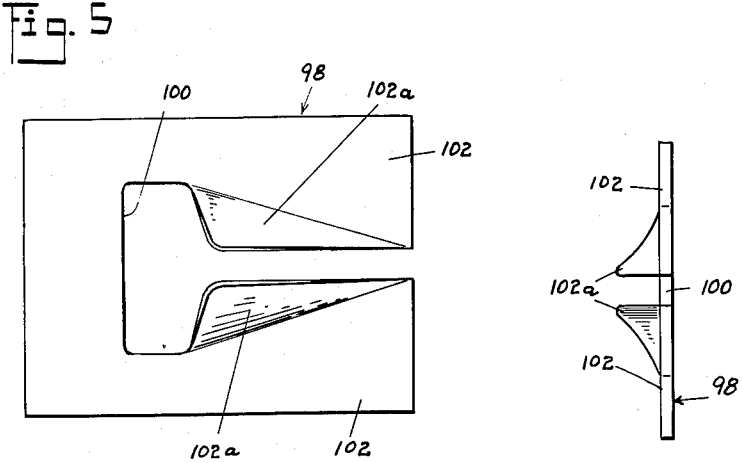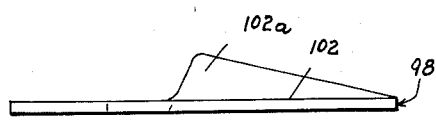

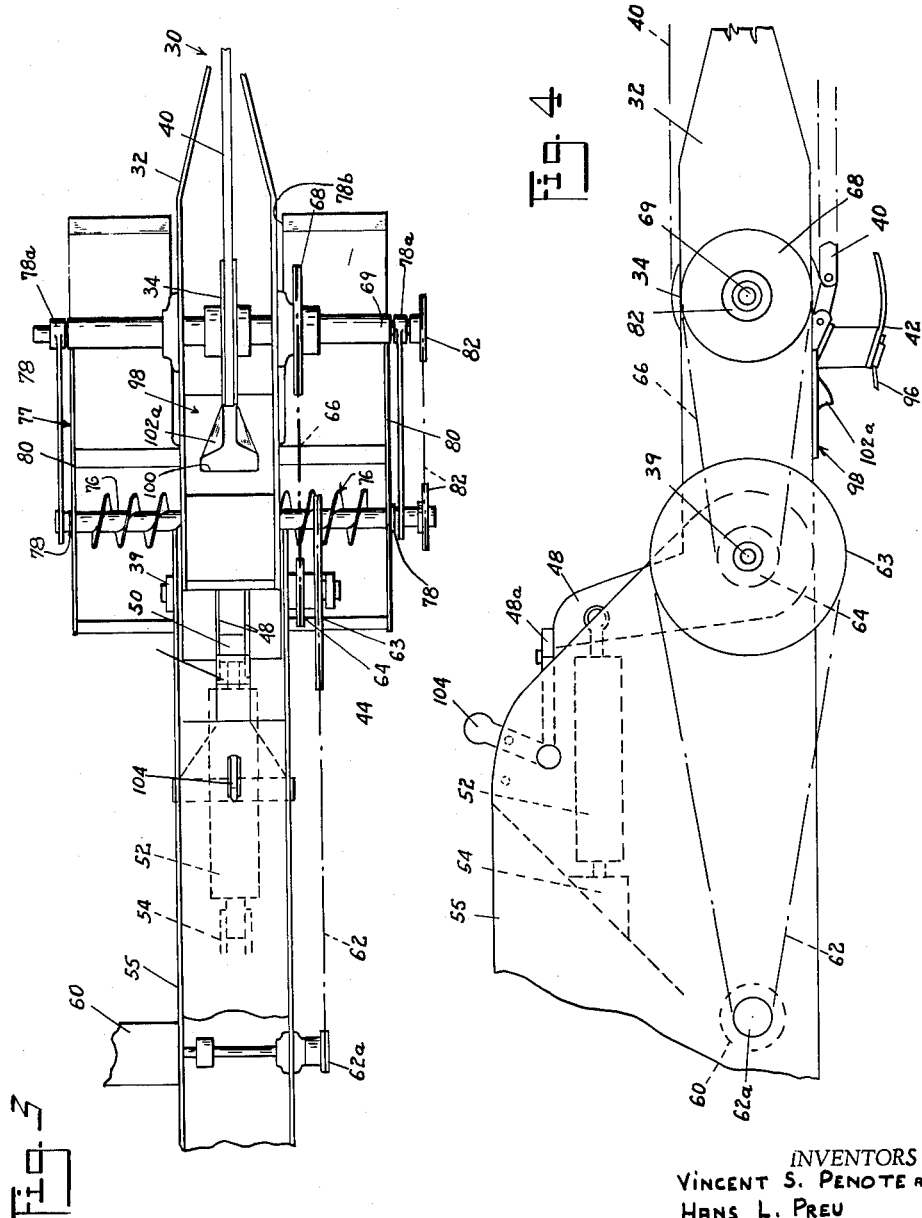

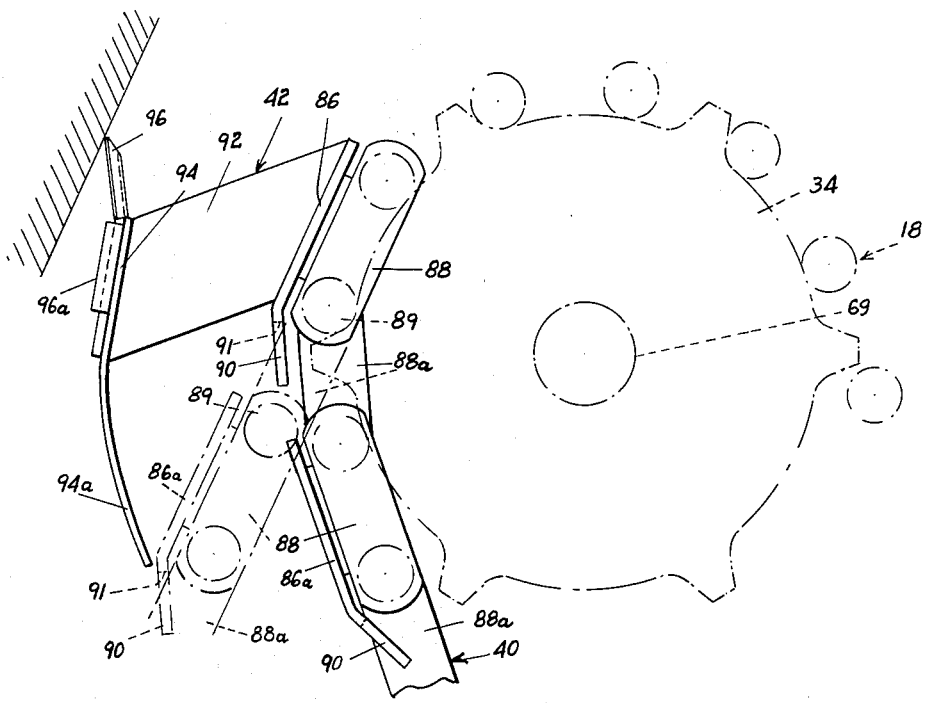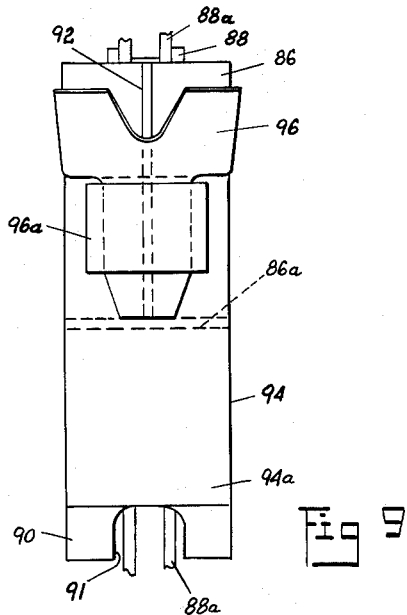

Aug. 31, 1965 V. S. PENOTE ETAL 3,203,119
MOBILE DITCHING MACHINE
Filed Nov. 23, 1962 6 Sheets-Sheet 5
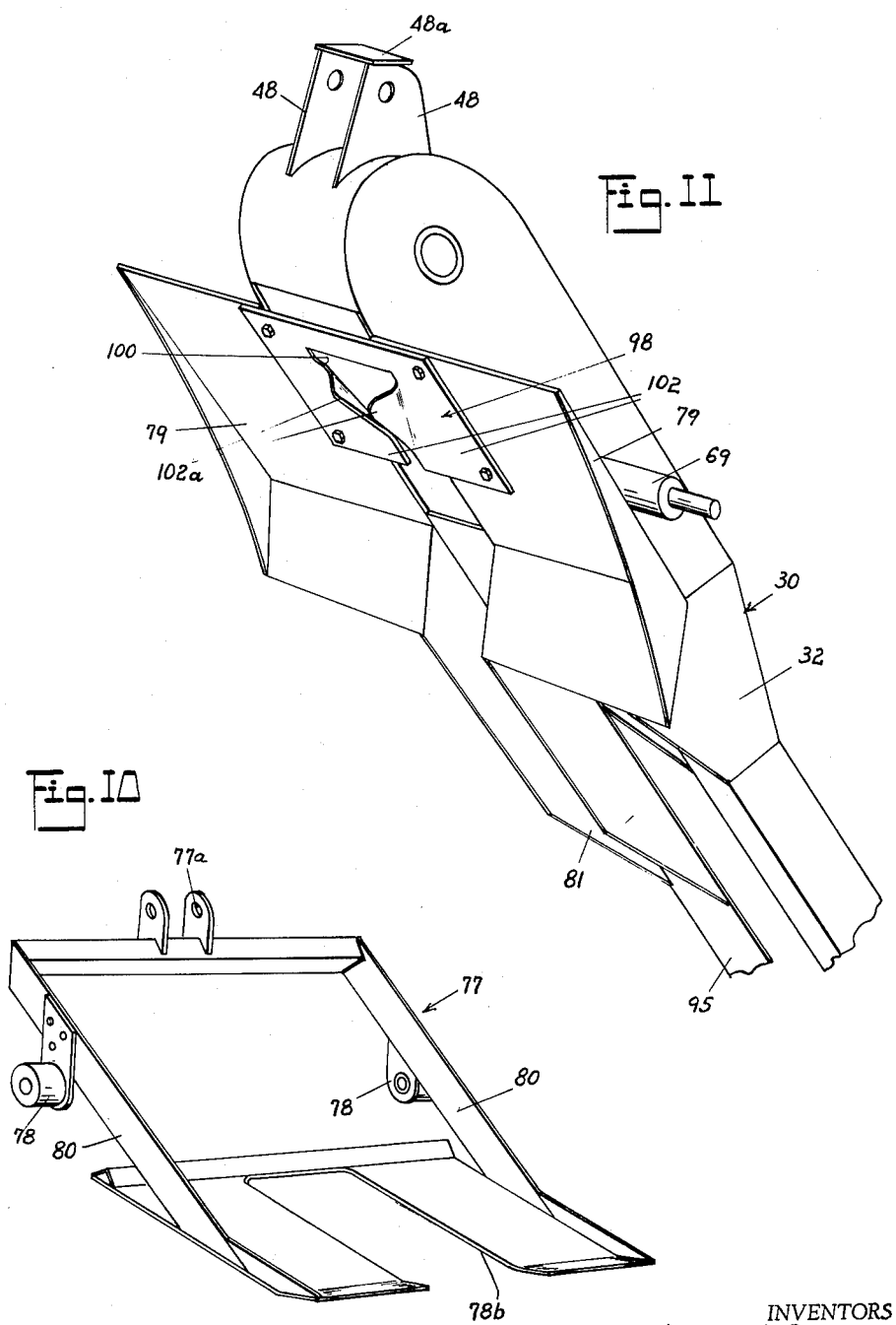
INVENTORS
VINCENT S. PENOTE AND
HANS L. PREU
BY
Teare, Tetzer & Teare
ATTORNEYS

United States Patent Office 3,203,119
Patented Aug. 31, 1965

3,203,119
MOBILE DITCHING MACHINE
Vincent S. Penote, Shaker Heights, and Hans L. Preu, Wickliffe, Ohio, assignors to The Cleveland Trencher Company, Cleveland, Ohio, a corporation of Ohio
Filed Nov. 23, 1962, Ser. No. 239,548
13 Claims. (Cl. 37—90)

This invention relates in general to a relatively light weight digger which may be used to advantage in connection with the excavation of trenches for such purposes as utility service lines, such as gas, water, sewer lines, and the like.

Both crawler track mounted service trenchers, and rubber tire mounted service trenchers are known in the excavating field of endeavor. The crawler track mounting has the advantage of good traction and floatation when crossing soft or boggy ground, and for materially aiding in preventing damage to lawn areas when working on them. The rubber tire mounted trencher has for its main advantage, rapid, self-propelled, transportability, when it is desired to move the trenching machine from place to place, but this rapid portability involves a sacrifice in digging efficiency, especially under slippery ground conditions.

Moreover, in most service type trenchers, the digging unit comprises an endless, single chain on which are mounted bucket-like scrapers or cutters of various types, which shove or push the excavated material upwardly generally to a location well above ground level, and then discharge the excavated material into a chute or cross conveyor disposed at a considerable distance above ground level. Such construction of trenching machine digging line is conventionally provided with some enclosure for the scrapers or buckets when they move above ground level, for retaining the excavated material with the scrapers or buckets up to the discharge mechanism. In the past, this enclosure means has often comprised a stationary channel shaped section, which received the moving bucket line therein in sliding relation and prevented the excavated material from spilling out the sides of the scrapers or buckets, until the discharge point at the upper end of the digging line had been reached.

The present invention provides a novel trenching machine which is adapted to be of a relatively light weight or in other words of the service trencher type, and which has endless tracks as the traction mechanism, for operating the trenching machine under normal digging conditions, but which also embodies wheel members which may be selectively extended and retracted, so that the trenching machine, when the wheels are extended, can be changed into a trailer-like, wheeled form, for rapid portability, when such machine is secured or attached to a pulling vehicle. The digging unit on the machine is preferably so constructed and arranged that when in a raised position, it can be used as the towing bar for the trenching machine. The invention also provides an excavating or trenching machine wherein the endless digging unit or digging line incorporates material transferring means located at approximately ground level, for transferring the excavated material laterally to a side of the excavation.

Accordingly, an object of the invention is to provide an improved digging or excavating machine of the light weight type.

Another object of the invention is to provide a generally light weight trenching machine, which embodies a plural arrangement of traction mechanisms, so that the trenching machine using one of the traction mechanisms has optimum operating characteristics during digging operations, and which alternate traction means facilitates the mobility of the machine, for efficient transporting of the machine from place to place, during other than digging operations.

A more specific object of the invention is to provide a novel, light-weight, service type trenching machine which has endless tracks for operating the trenching machine during the digging operations, and which also embodies retractable, pneumatic-tire wheels, which may be lowered into engagement with the ground, to raise the endless tracks off of the ground, for converting the trenching machine into a trailer-like arrangement, for rapid portability of the same on roads and the like.

Another object of the invention is to provide a relatively light-weight trenching machine which has a novel arrangement of digigng unit embodied therewith, for facilitating the digging operations, and more particularly one wherein the excavated material brought up from the excavation by open sided buckets on an endless digging line, is generally discharged therefore onto a material transferring screw extending transversely of the trenching machine and disposed at ground level.

Other features and advantages of the invention will be apparent from a consideration of the following description taken in conjunction with the accompanying drawings, wherein:

FIG. 1 is a partially broken, side elevational view of a trenching machine constructed in accordance with the instant invention, with the digging unit of the machine being disposed in digging position; in phantom lines in FIG. 1, there is disclosed a lowered position of the wheels of the trenching machine for rapid portability, and in full lines there is disclosed the raised position of such wheels for use of the endless tracks of the trencher;

FIG. 2 is a fragmentary, elevational, generally diagrammatic view, showing the lower end portion of the digging unit of the trenching machine of FIG. 1, with a trailer-coupling or hitch attached thereto, for coupling the trencher to a pulling vehicle, for rapid portability of the trenching machine when the wheels illustrated in FIG. 1 are disposed in "down" position;

FIG. 3 is a fragmentary, top plan view of the connection of the digging unit of the trenching machine with the chassis of the machine for permitting pivoting of the digging unit upwardly to inoperative position for use as a towing bar;

FIG. 4 is a fragmentary, side elevational view of the FIG. 3 arrangement;

FIG. 5 is an enlarged plan view of the bucket cleaner utilized in the digigng unit of the trenching machine of the invention;

FIG. 6 is an elevational view of the bucket cleaner of FIG. 5;

FIG. 7 is an end view of the bucket cleaner of FIG. 5, taken from the right hand end thereof;

FIG. 8 is a fragmentary elevational view showing a portion of the digging line and an associated bucket of the digging unit of the trenching machine, as the digging line moves around the drive sprocket of the digging unit; in dotted lines there is shown an aligned condition of the chain links of the digging line;

FIG. 9 is a top plan view of the FIG. 8 bucket and associated digging line chain;

FIGS. 10 and 11 are generally perspective views of respectively the skid or scraper structure, and the digging line boom and associated bucket cleaner, of the trencher construction;

Figure 1:
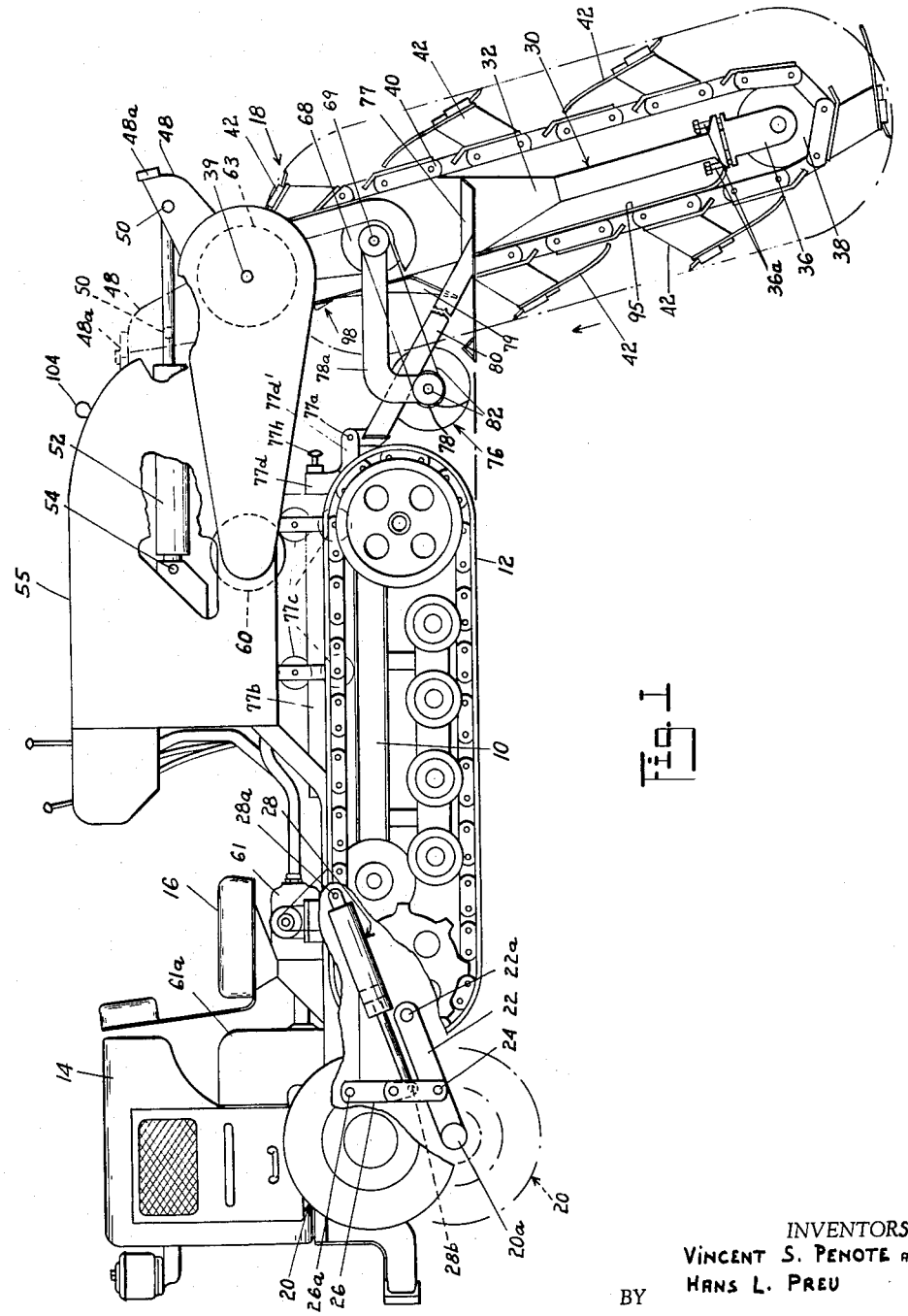
Figure 12:
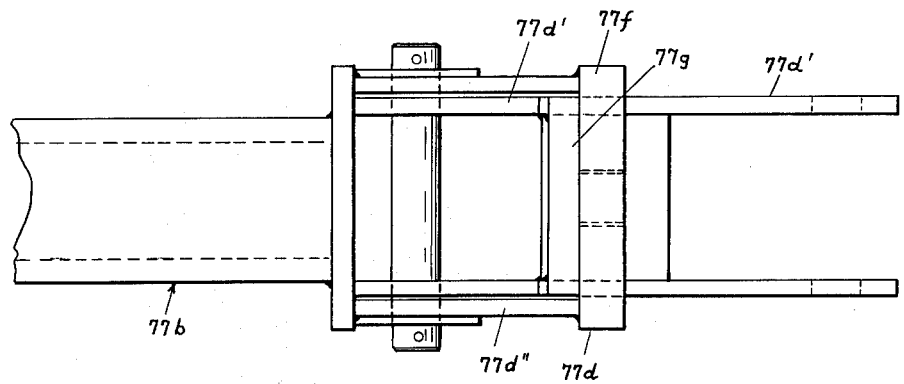
FIGS. 12 and 13 are respectively, fragmentary top plan and side elevational views of the movable, roller mounted member which supports the material transferring screw at ground level.

Referring now again to the drawings, the trenching machine of the invention may comprise a chassis frame 10, supported on spaced endless treads or tracks 12, of conventional, well-known construction. Mounted on the chassis at the forward end thereof may be an internal combustion motor 14. A machine operator's station 16 may be disposed adjacent engine 14, and supported adjacent the rear end of the chassis 10 in counterbalancing relation to engine 14 may be an endless digging unit 18.

In accordance with the instant invention, there is mounted on the chassis frame, and as for instance adjacent the forward end thereof, as illustrated, a pair of transversely spaced wheels 20, which in the embodiment illustrated are pneumatic rubber tired wheels. Such wheels may be rotatably mounted on an axle member 20a which may extend transversely of the machine, and with said axle member being pivotally mounted on the machine chassis by means of transversely spaced links 22, which are in turn pivoted as at 22a for angling movement in generally vertical planes. Pivotally attached to each link 22 and as at 24, may be an articulated toggle linkage 26, which in turn is pivotally mounted as at 26a to the machine chassis. A reciprocal, double acting fluid powered motor unit 28 may be provided, pivotally coupled at one end, as at 28a, to the machine chassis, and pivotally connected as at 28b to the toggle linkages 26, for purposes of raising and lowering the associated wheels and axle 20, 20a. It will be seen that upon the outward stroke of the motor unit 28, the wheels may be lowered to the phantom line position illustrated, and upon retraction of the motor unit, the wheels may be raised to the full line position illustrated in FIG. 1, which raised position locates the wheels above the endless tracks 12.

Referring now to the rearward end of the excavating machine, the digging unit 18 may comprise an adjustable length, boom 30 which may be of generally elongated, box-like construction, and which may include main section 32 on which may be rotatably mounted a drive sprocket member 34, and a lower section 36, which may be adjustably mounted for lengthwise movement with respect to the main section and by means of bolt and nut assemblies 36a, and which rotatably mounts a wheel member 38. Boom 30 is pivotally mounted on shaft 39 extending transversely of the machine, for swinging movement in a generally vertical plane. As can be best seen in FIG. 1, rotatable members 34 and 38 are disposed closer to the free end of the boom than is pivot shaft 39. Strung around the upper and lower rotatable members 34, 38 is an endless digging line in the form of a link chain 40, to which are attached an articulated type of scrapers or buckets 42, which will be hereinafter described in greater detail. The digging line and associated buckets pass between the side plates of boom section 32 upon movement around sprocket 34 and the digging line buckets create the excavation upon actuation of such digging line in the direction of the arrow in FIG. 1.

The upper end of the boom structure 30 may be provided with a pair of transversely spaced ear members 48 connected by transverse plate 48a and projecting outwardly from the boom structure and rigidly secured thereto. Pivotally coupled, as at 50, to ear members 48 is a double acting fluid powered, reciprocal motor unit 52, which in turn is pivoted as at 54 to the superstructure 55 of the machine. It will be seen therefore that upon actuation of motor unit 52 and extension of the piston rod thereof outwardly from the cylinder, the boom structure 30 and associated digging line is caused to pivot about axis 39 and downwardly toward digging position. Upon inward movement of the piston rod, the digging unit is swung upwardly toward an inactive, generally horizontally extending position.

The digging unit may be driven by means of a reversible, rotary-type, fluid driven motor 60, operatively coupled to a pump 61 driven from a power take-off of transmission 61a driven by the internal combustion engine 14. Motor 60 may be operatively coupled, as by means of chain and sprocket 62, 62a, to sprocket 63 rotatably mounted on pivot shaft 39. Another sprocket 64 may be secured to sprocket 63 which sprocket 64 may be coupled as by means of chain 66 to another sprocket 68 secured to shaft 69 to which is also secured the digging line drive sprocket 34. It will be seen therefore that upon rotation of sprocket 34 by driving of motor unit 60, the digging line will be driven. Suitable control mechanism (not shown) may be located on the vehicle in the vicinity of the operator's work station for the convenient and effective operation of motor units 28, 52 and 60.

Figure 14:
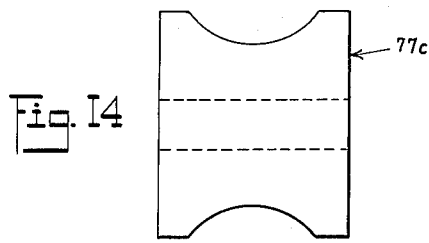
FIG. 14 is an elevational view of one of the rollers for supporting the FIGS. 12 and 13 member.

Now in accordance with the instant invention, there is provided a transversely extending, rotatable, soil conveying screw member 76 which may be connected to the digging boom 30 by means of skid or scraper member 77, pivoted as at 77a to an elongated support member 77b, which in the embodiment illustrated is of tubular construction, mounted for lengthwise movement of the machine chassis, on roller members 77c (FIGS. 1 and 14).

Figure 13:
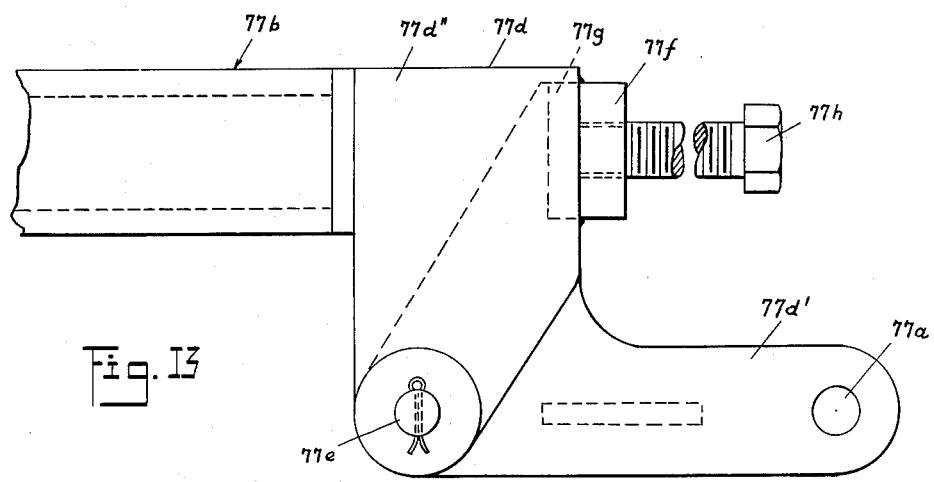

Member 77b has an articulated head portion 77d comprising a section 77d' connected to skid 77 and pivoted as at 77e to head section 77d". Section 77d" has an abutment 77f adapted for engagement with abutment 77g on pivotal section 77d' for limiting the clockwise pivoting (as viewed in FIG. 13) of section 77d' with respect to section 77d". An adjustable bolt 77h may be provided engageable with abutment 77g for adjusting this permissible pivoting.

The screw member 76 is rotatably mounted in bosses 78 on scraper 77, and the latter may be connected to the boom by laterally disposed arms 78a pivoted to shaft 69 on boom 30 and pivoted to bosses 78 on the scraper. An opening 78b is provided in the scraper through which extends the digging unit 18. The conveyor screw 76 is adapted to be disposed in close proximity to the ground, as best shown in FIG. 1, and may be driven by means of sprocket and chain 82 driven from shaft 69 of the digging line.

In order to urge the material excavated by the digging line into the rotatable screw 76, the boom may be provided with laterally extending wings 79 (FIGS. 1 and 11) adapted to be disposed between the arms 80 of scraper 77 and to urge or push the excavated material into the screw as the trencher moves forwardly. Wings 79 may be provided with downwardly extending extensions 81 which define a passageway through which passes the digging line.

Referring now in particular to FIGS. 8 and 9, it will be seen that the buckets 42 in the instant arrangement each comprise a pair of back up plates 86, 86a connected to alternate links 88 of the digging line chain. It will be seen that the digging line comprises links 88, 88a pivotally interconnected as at 89. The plates 86, 86a may be attached by any suitable means to the respective links and as for instance by means of welds. It will be seen that each of the plates at its tail end is bent downwardly as at 90 and is provided with a slot 91 therein for receiving the associated link 88a without interference when the links are in a linear or aligned condition during their travel. Plates 86, 86a provide a substantially continuous back surface for each associated bucket, and it will be noted that only links 88a coact with the teeth on the sprocket, and the aforementioned notches 91 in each of the plates provide for movement of any accumulation of excavated material in links 88a outwardly through such notches in the plates by virtue of the teeth of the sprocket wheel.

Each plate 86 is provided with a centrally disposed web 92 projecting generally diagonally outwardly from the associated plate. Each web carries on its outer edge a plate 94 of substantially the same width as the plates 86, 86a. This plate 94 extends rearwardly and curves inwardly as at 94a, terminating in generally spaced relationship to the rear end of the associated back plate 86a. Accordingly, the plates 94 form the front or spade portions of the excavating buckets, the back of the buckets being formed by the paired plates 86, 86a of the respective chain links, and with the central web 92 supporting the spade portion of the bucket, the latter thus being opened on its sides. Each of the spade plate portions 94 may be provided on its leading end with a rooter tip element 96 which is suitably attached as by means of a sleeve or socket 96a mounted on the outer surface of the respective spade portion of the bucket. A back up plate 95 secured to the boom 30 may be provided for co-acting in sliding relation with the digging line to maintain the stability of the forward stretch thereof during the digging operations.

Now in the event that the material excavated by the buckets is of a sticky nature, and is not readily discharged by gravity from the scraper buckets upon their movement above ground level, there may be provided a bucket cleaner element 98 disposed adjacent the upper end of the boom structure, which bucket cleaner element has a generally T-shaped opening 100 therein, through which is adapted to move the spade portion 94 and web portion 92 of each bucket, as the buckets move around the upper sprocket member 34. Thus the finger portions 102 of the bucket cleaner extend from the center web 92 to each side of the bucket, and scrape out any material therein, such material falling downwardly to be carried forward by the forward movement of the excavating machine and the associated action of the wings 79 and into the spoil screw 76 from whence it is moved laterally to a side of the excavation. Beveled portions 102a on the bucket cleaner aid in removing the dug material from the bucket and more or less peel the material from each side of the bucket.

When it is desired to rapidly transport the trenching machine from place to place, the motor unit 52 may be actuated to cause pivoting of the digging unit 18 upwardly about the axis of shaft 39. A releasable latching mechanism 104 (FIGS. 3 and 4) may be provided for locking the digging unit in its inactive or upwardly pivoted position. A tow bar member 110 may be detachably connected to the boom of the digging unit, as by means of nut or bolt assemblies 112, and such tow bar may be coupled to a pulling vehicle P, for rapid transporting of the trenching machine from place to place, upon lowering of wheels 20. It will be seen that upon upward pivoting of the digging unit about shaft 39, support member 77b will slide outwardly or rearwardly with respect to the chassis to provide for the movement of the screw 76 which is coupled to the digging unit by arms 78a.

From the foregoing description and accompanying drawings it will be seen that the invention provides a novel arrangement of service trenching machine, and one that may be rapidly transported from place to place, and which also possesses endless treads for optimum performance during digging operations, and also a trencher that has a novel digging unit for not only facilitating the digging operation but also for movement of the machine from place to place.

The terms and expressions which have been used are used as terms of description and not of limitation, and there is no intention in the use of such terms and expressions of excluding any equivalents of any of the features shown, or described, or portions thereof, and it is recognized that various modifications are possible within the scope of the invention claimed.

We claim:

1. A mobile trenching machine comprising a chassis, traction mechanism mounting the chassis for movement along the ground, an endless digging unit of the ladder type swingably mounted on said chassis for movement in a generally vertical plane, means for swinging said digging unit from an inoperative generally horizontally extending position to an operative generally vertically extending digging position and vice versa, means associated with said digging unit adapted for coupling said machine to a towing vehicle for rapid portability of said machine upon movement of said digging unit to said inoperative position, and spoil transferring means including a rotable screw on said machine extending generally transversely of said chassis forwardly of said digging unit, such spoil transferring means being disposed substantially at ground level intermediate said digging unit and said traction mechanism and adapted to receive spoil from said digging unit and transfer it to a side of the excavation, means extending between said chassis and said digging unit and coupling said screw to said chassis and to said digging unit, the last mentioned means providing for relative substantially linear movement of said screw with respect to said chassis during swinging movement of said digging unit with respect to said chassis.

2. A mobile trenching machine in accordance with claim 1 including means coacting between said screw and said digging unit for driving said screw upon driving of said digging unit.

3. In a mobile trenching machine comprising a chassis, traction mechanism supporting said chassis for movement along the ground, a digging unit mounted on one end of said chassis, means for driving said digging unit, spoil conveyor means adapted to receive spoil from said digging unit and transfer it to a side of the excavation, said digging unit comprising an elongated boom pivotally mounted on said chassis for movement in a generally vertical plane, a pair of wheels on opposite ends of said boom at least one of which is provided with sprocket teeth, a bucket equipped excavator chain looped about said wheels and comprising a plurality of pivotally interconnected links, certain of said links having an opening therethrough adapted to receive the sprocket teeth for moving the chain with respect to the wheels, each of the buckets comprising a pair of back plates disposed in generally aligned relation on said chain, each of said plates being secured to an alternate link on said chain, said plates coacting with one another to form a substantially continuous surface for the respective bucket on the outer face of substantially linear stretches of said chain, to provide bucket backs for the buckets of the chain, the leading one of each pair of said plates having a centrally disposed longitudinally extending generally upstanding web secured thereto, a front plate secured to the respective web and curving inwardly to terminate adjacent the rearward extremity of the rearwardmost of the respective of said bucket back plates, to form a front wall for each of the buckets, each of said back plates at the trailing end portion thereof being bent inwardly in a direction toward said chain, each of said back plates having a notch therein in said trailing end portion thereof overlying the opening in an adjacent one of said certain links, said slot receiving therethrough the chain in the linear stretches thereof, wherein said trailing end portions straddle the chain, said central web terminating short of said notch in the respective back plate.

4. In a mobile trenching machine comprising a chassis, traction means mounting said chassis for movement along the ground, an endless digging unit pivotally mounted on said chassis for movement from an inoperative position to an operative digging position and vice versa, means for driving said digging unit, rotatable screw means extending generally transversely of said chassis and adapted to receive spoil from said digging unit and transfer it to a side of the machine means extending between said chasis and said digging unit and coupling said screw to said chasis and to said digging unit, the last mentioned means providing for relative substantially linear movement of said screw with respect to said chassis during swinging movement of said digging unit with respect to said chassis.

5. A mobile trenching machine comprising a chassis, endless belt traction treads mounting the chassis for movement of the machine along the ground, an endless digging unit swingably mounted on said chassis, means for swinging said digging unit from an inoperative position into an operative digging position and vice versa, wheel means for mounting said chassis for more rapid movement along the ground, means movably mounting said wheel means on said chassis for selectively raising and lowering said wheel means above and below said traction treads, means on said digging unit adapted for coupling said digging unit to a towing vehicle for rapid portability of said machine upon said lowering of said wheel means and movement of said digging unit to said inoperative position, spoil transferring means on said machine including a rotatable screw extending generally transversely of said chassis in close proximity to the ground and adapted to receive spoil from said digging unit and transfer it to a side of the excavation, means extending between said chassis and said digging unit and coupling said screw to said chassis and to said digging unit, the last mentioned means providing for relative substantially linear movement of said screw with respect to said chassis during swinging movement of said digging unit with respect to said chassis.

6. In a mobile trenching machine comprising a chassis, traction mechanism supporting said chassis for movement along the ground, a digging unit mounted on one end of said chassis, means for driving said digging unit, spoil conveyor means adapted to receive spoil from said digging unit and transfer it to a side of the excavation, said digging unit comprising an elongated boom pivotally mounted on said chassis for movement in a generally vertical plane, a pair of rotatable members adjacent opposite ends of said boom at least one of which is provided with sprocket teeth, a bucket equipped excavator chain looped about said rotatable members and comprising a plurality of pivotally interconnected links, each of said buckets comprising a pair of back plates disposed in generally aligned relation on said chain, said back plates coacting with one another to form a substantially continuous surface for the respective bucket on the outer face of substantially linear stretches of said chain, to provide bucket backs for the buckets, the leading one of each pair of said plates having a centrally disposed longitudinally extending upstanding web secured thereto, a front plate secured to the respective web and curving inwardly to terminate adjacent the rearward extremity of the rearwardmost of the respective of said bucket back plates, to form a front wall for each bucket, each of said back plates at the trailing end portion thereof being bent inwardly in a direction toward said chain, and a bucket cleaner mounted on said boom adjacent one of said rotatable members, said bucket cleaner comprising a plate-like member having an opening therein adapted to receive therethrough said web and said front plate of each of the buckets during driving of said digging unit, said plate-like member being adapted to urge any material scraped from the respective bucket toward said spoil conveyor means.

7. A mobile trenching machine in accordance with claim 6 wherein said cleaner plate is rigidly secured to said boom and said plate opening is of T shaped configuration partially defining leg sections adapted to straddle the bucket webs upon movement of the latter through said cleaner plate opening, the inner edges of said leg sections being beveled outwardly.

8. In a mobile trenching machine comprising a chassis, traction means mounting said chasis for movement along the ground, an endless digging unit pivotally mounted on said chassis for movement from an inoperative position to an operative digging position and vice versa, means for driving said digging unit, rotatable screw means extending generally transversely of said chassis and adapted to receive spoil from said digging unit and transfer it to a side of the machine, means for rotating said screw means, and means movably coupling said screw means to said chassis and to said digging unit and providing for movement of said screw means with respect to said chassis upon pivotal movement of said digging unit with respect to said chassis, said coupling means including an elongated member slidable lengthwise of said chassis and pivotally coupling said screw means thereto.

9. A trenching machine in accordance with claim 8 including roller means mounted on said chassis and coacting with said elongated member for facilitating lengthwise movement thereof with respect to said chassis.

10. A trenching machine in accordance with claim 8, wherein said elongated member comprises an articulated head portion including a pivotal section and a relatively stationary section, said pivotal section being pivotally coupled to said screw means, and means on said head portion for adjusting the pivotal movement of said pivotal section with respect to said stationary section.

11. A trenching machine in accordance with claim 8, including laterally extending wings on said digging unit adapted to urge excavated material coming from said digging unit into said screw means upon forward movement of said trenching machine.

12. A trenching machine in accordance with claim 8, including scraper means rotatably mounting said screw means thereon, said scraper means comprising skids which are adapted to engage the ground and support the screw means in close proximity to the ground during movement of said trenching machine.

13. A mobile trenching machine comprising, a chassis, endless belt traction treads mounting the chassis for movement of the machine along the ground, an endless digging unit movably mounted adjacent the rearward end of said chassis, means for moving the digging unit from an inoperative position to an operative digging position and vice versa, wheel means disposed at the front end of said chassis forwardly of said traction treads for mounting said chassis for more rapid movement along the ground, means movably mounting said wheel means on said chassis for selectively raising and lowering said wheel means above and below said traction treads, and tow means disposed adjacent the distal end of said digging unit for coupling said machine to a towing vehicle for rapid portability of said machine upon said lowering of said wheel means and movement of said digging unit to said inoperative position.

References Cited by the Examiner

UNITED STATES PATENTS

| 1,509,030 | 9/24 | Roy _____ | 180—9.3 |
| 1,721,175 | 7/29 | Brown _____ | 37—86 |
| 1,769,074 | 7/30 | Ruatti. | |
| 2,599,778 | 6/52 | Przybylski _____ | 37—90 |
| 2,667,709 | 2/54 | Askue _____ | 37—191 X |
| 2,747,307 | 5/56 | Griffin _____ | 37—90 |
| 3,044,194 | 7/62 | Balkheimer _____ | 37—86 |
| 3,057,088 | 10/62 | George _____ | 37—86 |
| 3,103,754 | 9/63 | Weiger _____ | 37—192 |
| 3,130,506 | 4/64 | Laster _____ | 37—86 |
| 3,133,365 | 5/64 | Davis _____ | 37—191 |

FOREIGN PATENTS

| 848,483 | 1/39 | France. |
| 1,170,612 | 9/58 | France. |

BENJAMIN HERSH, *Primary Examiner.*